United States Patent
Passage et al.

[11] Patent Number: 6,028,287
[45] Date of Patent: Feb. 22, 2000

[54] PLASMA ARC TORCH POSITION CONTROL

[75] Inventors: Christopher S. Passage; John Sobr; Jeffrey L. Peterson, all of Lebanon, N.H.

[73] Assignee: Hyperthem, Inc., Hanover, N.H.

[21] Appl. No.: 09/020,621

[22] Filed: Feb. 9, 1998

Related U.S. Application Data

[63] Continuation-in-part of application No. 08/900,309, Jul. 25, 1997.

[51] Int. Cl.⁷ .................................................. B23K 9/00
[52] U.S. Cl. ................................ 219/121.56; 219/121.54
[58] Field of Search ................ 219/121.56, 124.03, 219/121.44, 121.54, 121.57; 6318/568.11

[56] References Cited

U.S. PATENT DOCUMENTS

| | | | |
|---|---|---|---|
| 4,101,754 | 7/1978 | Fischer | 219/121 P |
| 4,203,022 | 5/1980 | Couch, Jr. et al. | 219/121 P |
| 4,415,795 | 11/1983 | Ross et al. | 219/121 PH |
| 4,650,957 | 3/1987 | Cullen et al. | 219/124.03 |
| 4,677,275 | 6/1987 | Schmall | 219/124.03 |
| 4,682,004 | 7/1987 | Schmall | 219/121 PC |
| 4,766,286 | 8/1988 | Iceland | 219/121.57 |
| 4,795,882 | 1/1989 | Hardwick et al. | 219/124.02 |
| 4,888,490 | 12/1989 | Bass et al. | 250/561 |
| 5,160,821 | 11/1992 | Oakley | 219/121.56 |
| 5,187,348 | 2/1993 | Cuba et al. | 219/124.02 |
| 5,192,847 | 3/1993 | Jagiella et al. | 219/121.6 |
| 5,288,970 | 2/1994 | Nishi | 219/121.56 |
| 5,290,995 | 3/1994 | Higgins et al. | 219/121.44 |
| 5,326,955 | 7/1994 | Nishi et al. | 219/121.56 |
| 5,371,336 | 12/1994 | Albert et al. | 219/121.54 |
| 5,521,350 | 5/1996 | Nishi et al. | 219/121.56 |
| 5,620,617 | 4/1997 | Borowy et al. | 219/121.54 |
| 5,844,197 | 12/1998 | Daniel | 219/121.57 |
| 5,866,872 | 2/1999 | Lu et al. | 219/121.56 |

FOREIGN PATENT DOCUMENTS

| | | |
|---|---|---|
| 0 562 111 | 9/1993 | European Pat. Off. . |
| WO 94 05456 | 3/1994 | WIPO . |

*Primary Examiner*—Tu Ba Hoang
*Assistant Examiner*—Quanf Van
*Attorney, Agent, or Firm*—Testa, Hurwitz & Thibeault LLP

[57] ABSTRACT

A torch height control system maintains a substantially constant operating parameter of the arc during processing of a workpiece by measuring the operating parameter, comparing the operating parameter to a reference value to generate a deviation, adjusting a standoff between the torch and the workpiece by moving the torch relative to the workpiece at a rate which increases with an increase in the deviation to minimize the deviation, and clamping the rate of torch movement relative to the workpiece when the deviation exceeds a predetermined value.

15 Claims, 18 Drawing Sheets

FIG. 5
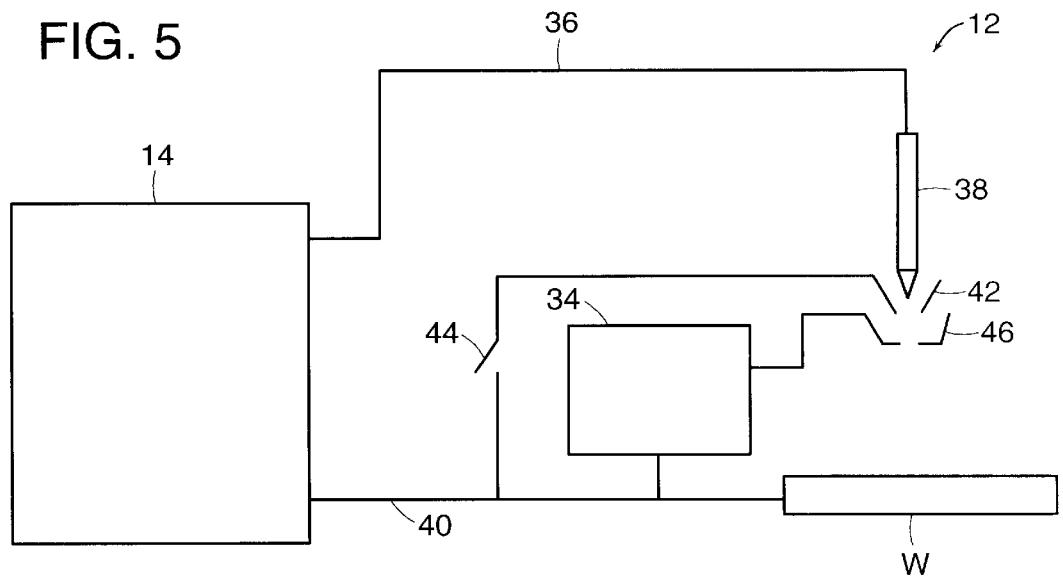
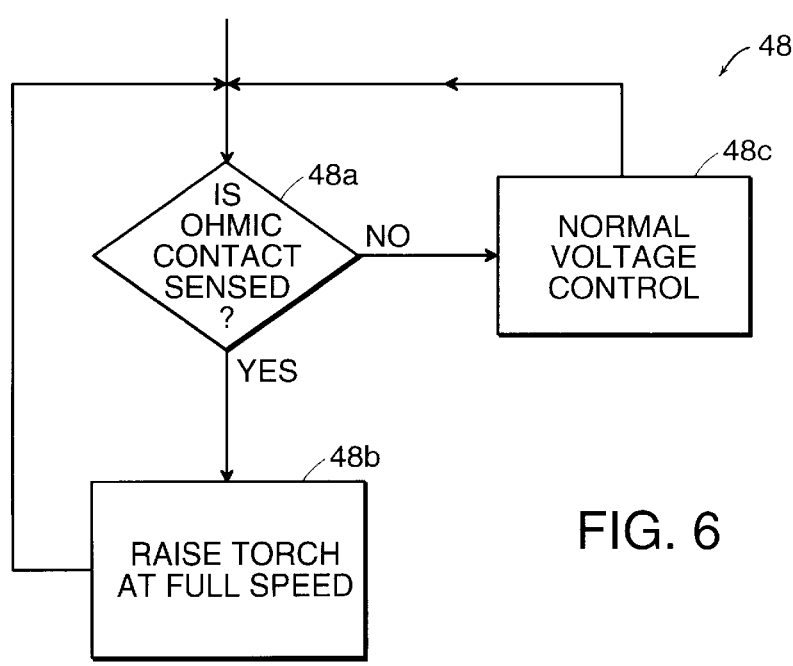
FIG. 6

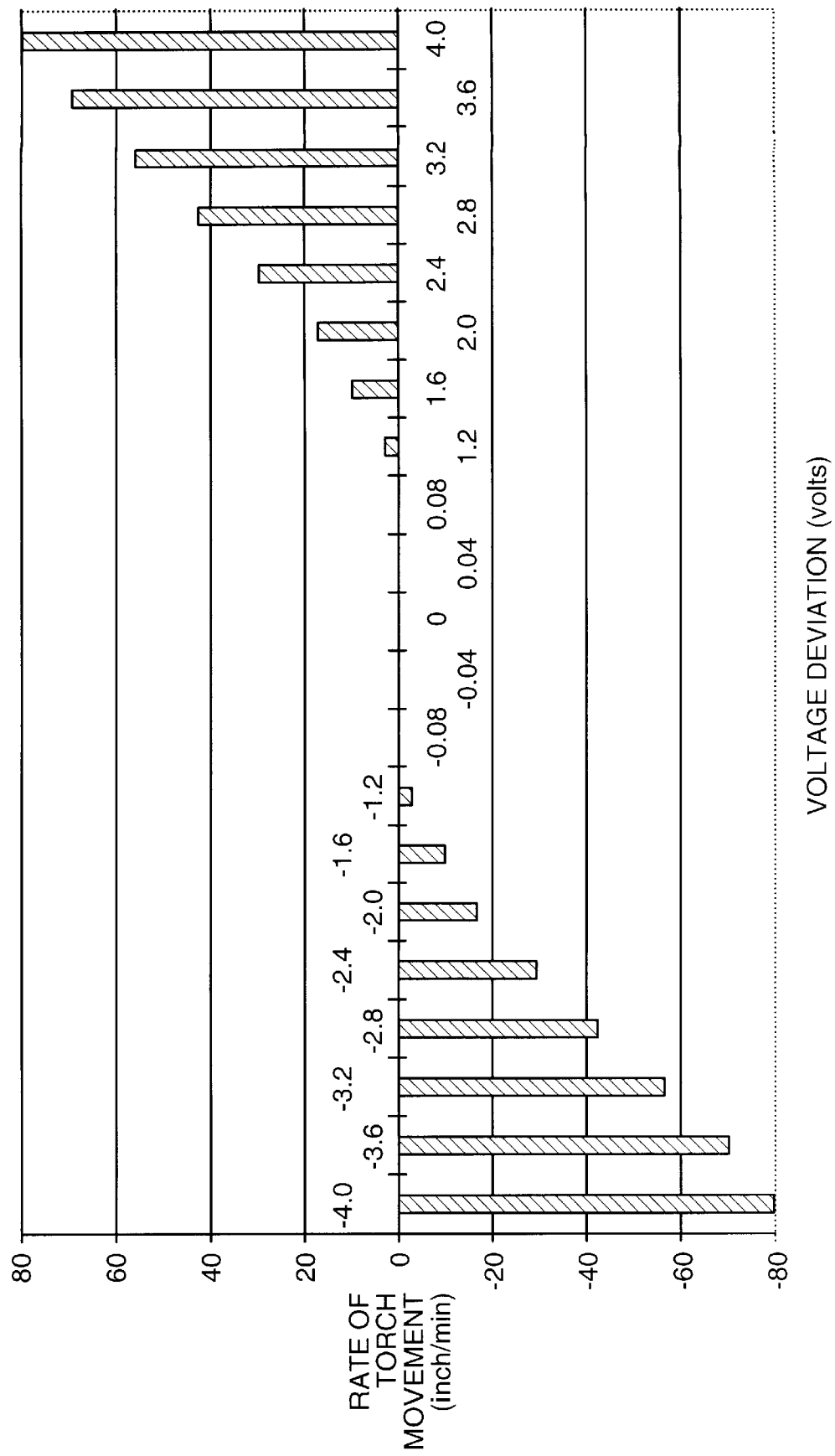

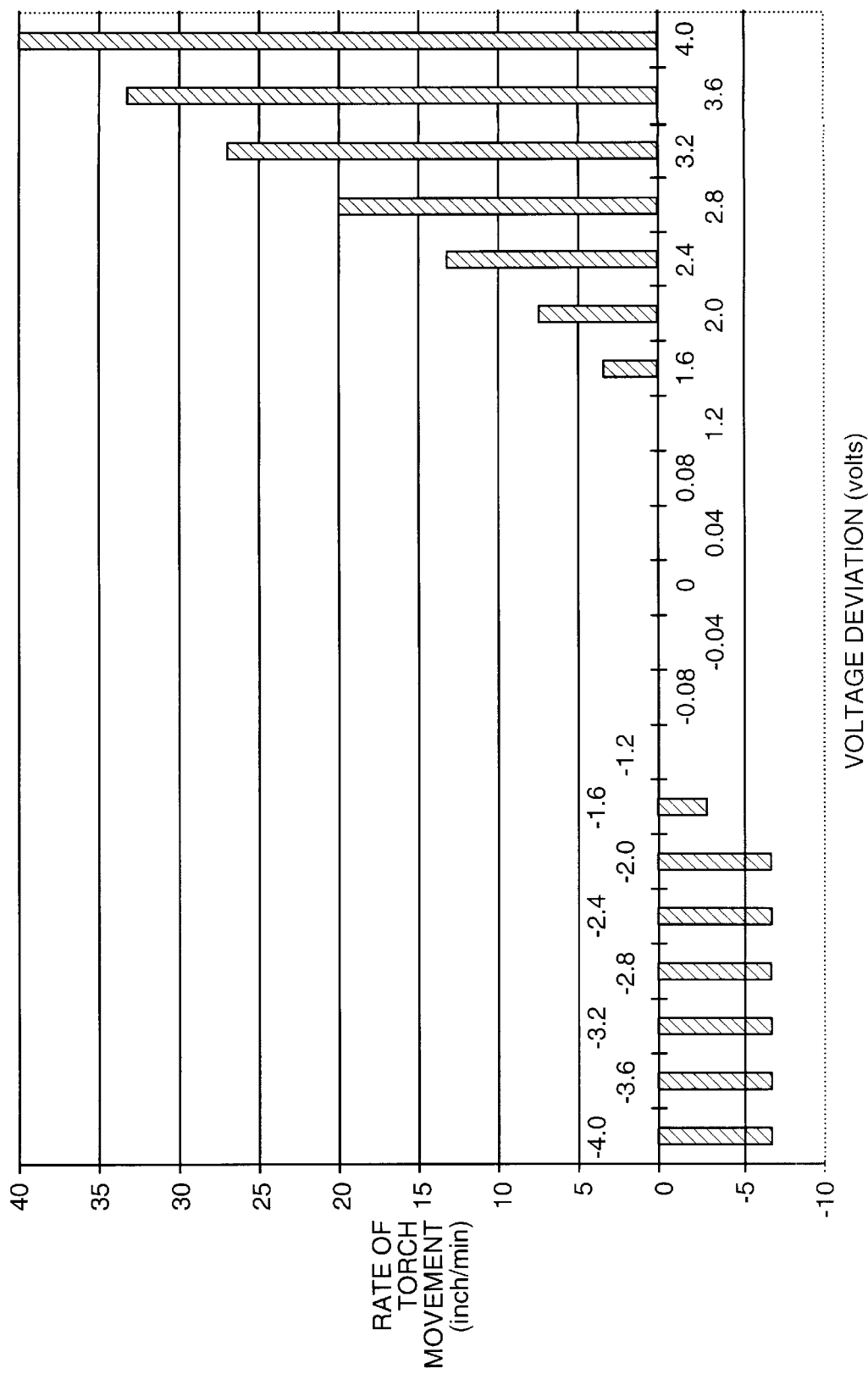

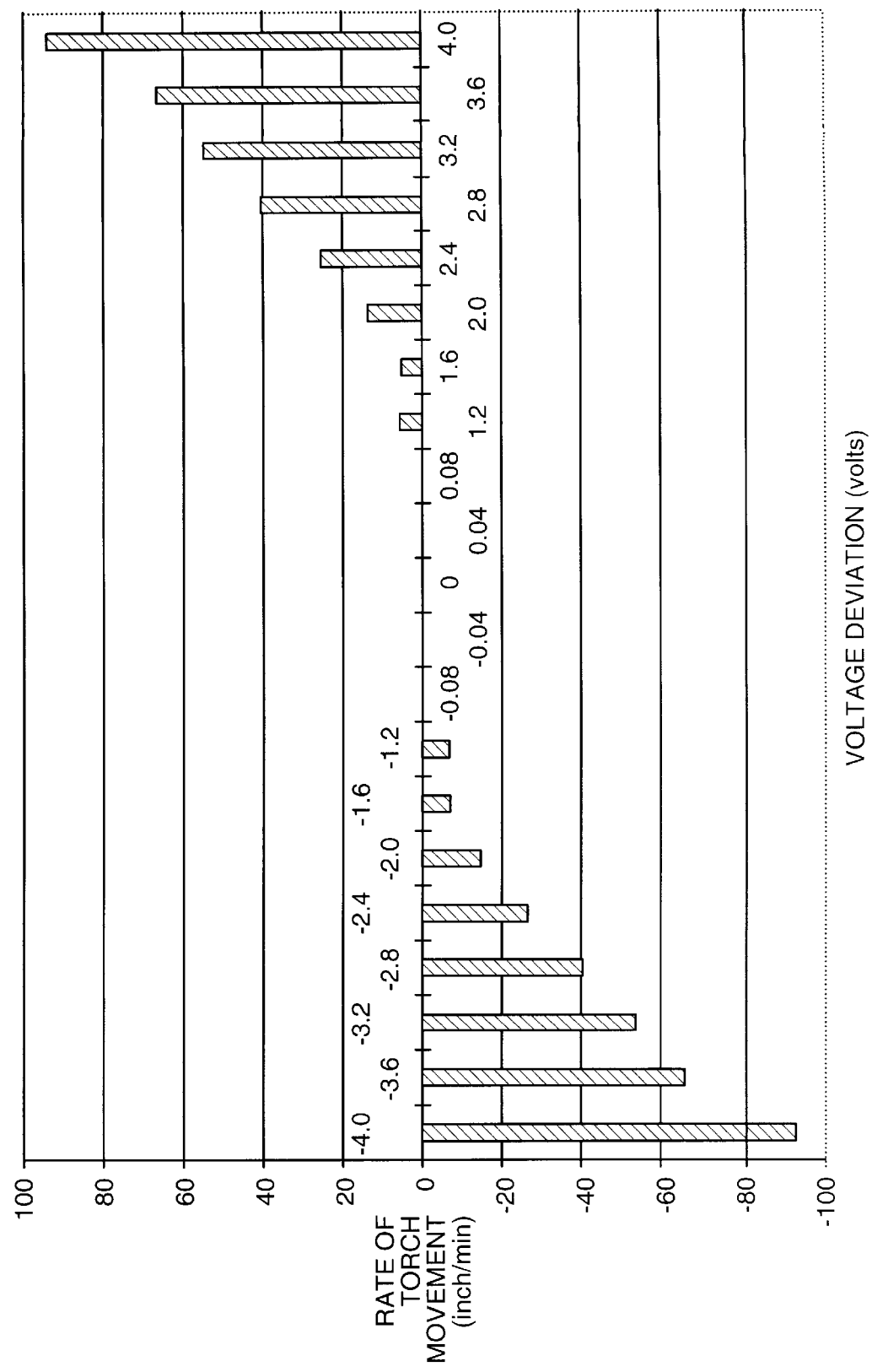

PLASMA ARC TORCH POSITION CONTROL

RELATED APPLICATIONS

This application is a continuation-in-part of U.S. Ser. No. 08/900,309 filed on Jul. 25, 1997.

TECHNICAL FIELD

The present invention relates to plasma arc torch systems and, more specifically, to a plasma arc torch position control employing feedback methods and apparatus to automatically control a standoff between a tip of the torch and a workpiece being processed.

BACKGROUND

Plasma arc torches are widely used for cutting metallic materials and can be employed in automated systems for automatically processing a workpiece. The system may include the plasma arc torch, an associated power supply, a positioning apparatus, and an associated controller. The plasma arc torch and/or the workpiece may be mounted on the positioning apparatus which provides relative motion between the tip of the torch and the workpiece to direct the plasma arc along a processing path.

The plasma arc torch generally includes a torch body, an electrode mounted within the body, passages for cooling and arc control fluids, a swirl ring to control the fluid flow patterns, a nozzle with a central exit orifice, electrical connections, and a power supply. The torch produces the plasma arc, which is a constricted ionized jet of a plasma gas with high temperature and high momentum. A shield may also be employed on the tip of the torch to protect the nozzle and to provide a shield gas flow to the area proximate the plasma arc. Gases used in the torch can be non-reactive (e.g. argon or nitrogen), or reactive (e.g. oxygen or air).

In operation, the tip of the torch is positioned proximate the workpiece by the positioning apparatus. A pilot arc is first generated between the electrode (cathode) and the nozzle (anode) by using, for example, a high frequency, high voltage signal. The pilot arc ionizes gas passing through the nozzle exit orifice. As the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, to cut the workpiece.

The controller directs the torch tip along a nominal processing path. Due to variability in workpiece geometry and relative spatial location of the workpiece and the torch tip, the standoff or distance between the torch tip and workpiece may vary along the processing path. When employing a constant output current generator, changes in standoff and resultant plasma arc length effect arc voltage, arc power, and cut quality. In extreme cases, the torch tip can crash into the workpiece or be so far from the workpiece that the plasma arc is extinguished.

Some systems employ feedback control, controlling the arc voltage during processing by adjusting the standoff to maintain a predetermined arc voltage value. Such control schemes, however, are problematic in a variety of common scenarios. For example, when the torch tip traverses a discontinuity in the workpiece such as a kerf, the arc voltage increases rapidly. To compensate for the increase, the controller directs the positioning system to decrease standoff rapidly, which can result in the torch tip crashing into the workpiece. Such shortcoming limits the usefulness of these feedback control schemes.

Other types of feedback control are known to initially position the torch tip relative to the workpiece. For example, some systems drive the torch tip into the workpiece until the structure on which the torch is mounted deflects. Corrective action is then taken, such as reversing direction of travel to retract the torch a predetermined distance. Other systems may drive the torch tip into the workpiece until detection of an increase in drive motor power, then reverse motor direction for a predetermined period. These systems, however, tend to stress the mechanical components of the positioning apparatus and torch and can damage delicate components thereof due to repeated impact.

SUMMARY OF THE INVENTION

In one aspect, the present invention features a plasma arc torch system which includes a plasma arc torch and an associated power supply for generating a plasma arc between an electrode of the torch and a workpiece to be processed. A positioning apparatus and controller are provided for relatively moving the torch and the workpiece along a processing path. The controller includes a module for measuring an operating parameter of the system and minimizing a deviation between the measured operating parameter and a predetermined reference value by controlling a standoff between the torch and the workpiece. The controller also includes at least one additional or second module for overriding the standoff control of the first module under certain operational conditions.

According to the method of the invention, the torch is positioned proximate a workpiece and moved relative thereto along a processing path. An operating parameter of the system is maintained substantially constant during workpiece processing by measuring the operating parameter, comparing the measured value to a reference value to generate a deviation, and controlling a standoff between the torch and the workpiece to minimize the deviation. In certain circumstances, control of the standoff is overridden.

In another aspect, the present invention features a plasma arc torch system which includes a plasma arc torch, a positioning apparatus and a torch height control system. The plasma arc torch generates an arc between the torch and a workpiece. The positioning apparatus moves the torch relative to the workpiece. The torch height control system maintains a substantially constant operating parameter of the arc voltage during the processing of the workpiece. The torch height control system includes a first module and a second module. The first module measures the operating parameter, compares the operating parameter to a reference value to generate a deviation, and adjusts a standoff between the torch and the workpiece by moving the torch relative to the workpiece at a rate which increases with an increase in the deviation to minimize the deviation. The second module clamps the rate of torch movement relative to the workpiece when the deviation exceeds a predetermined value.

According to the method of the invention, a plasma arc torch is positioned proximate to the workpiece, an arc is generated between the torch and the workpiece, and the torch is moved relative to the workpiece along a processing path. A substantially constant operating parameter of the arc voltage is maintained during processing of the workpiece using the following steps. The operating parameter is measured, then compared to a reference value to generate a deviation. A standoff between the torch and the workpiece is adjusted by moving the torch relative to the workpiece at a rate which increases with an increase in the deviation to minimize the deviation. The rate of torch movement relative to the workpiece is clamped when the deviation exceeds a predetermined value.

Several advantages may be realized by employing the apparatuses and methods according to the invention. For example, cut quality is more consistent and of higher quality than that produced by conventional systems since either torch standoff or rate of torch movement is maintained substantially constant during the operation, including when crossing discontinuities in the workpiece such as kerfs, thereby preventing the torch from crashing into the workpiece.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIG. 5 is a schematic block diagram of a plasma arc torch including a contact sensing apparatus for overriding standoff control in accordance with an alternative embodiment of the present invention.

FIG. 6 is a flow chart for controlling standoff and overriding standoff control in accordance with the apparatus depicted in FIG. 5;

FIG. 12A illustrates a normal symmetric torch movement rate profile for a robotic lifter.

FIG. 12D illustrates a slow torch movement rate profile with a limited down speed for a robotic lifter.

FIG. 13A illustrates a normal symmetric torch movement rate profile for an XY lifter.

DETAILED DESCRIPTION

Figure 1A:
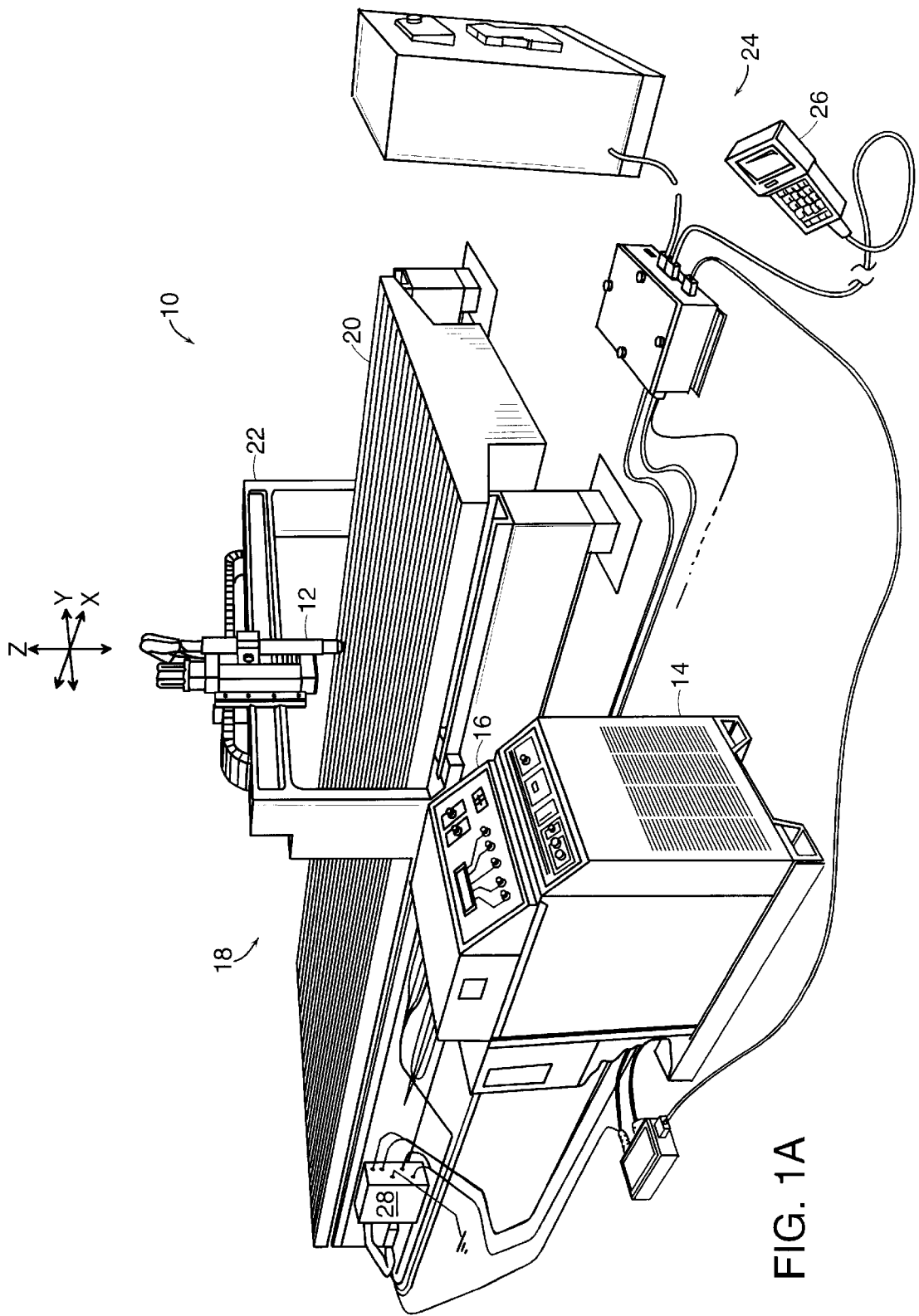
FIG. 1A is a schematic perspective view of a plasma arc torch system in accordance with an exemplary embodiment of the present invention.

FIG. 1A is a schematic perspective view of a plasma arc torch system 10 in accordance with an exemplary embodiment of the present invention. The system 10 includes a plasma arc torch 12 with an associated power supply 14 and a gas console 16 for generating a plasma arc. A positioning apparatus 18 includes a generally planar table 20 for fixturing of a workpiece (not depicted), an overlaying gantry 22 having three motorized, mutually orthogonal linear axes X, Y, and Z with the torch 12 mounted on the Z axis, and a suitable controller 24 with three axis drives. The controller 24 includes a first module for controlling a standoff between the torch 12 and a workpiece, as well as a second module for overriding the first module as will be discussed in greater detail hereinbelow. The controller 24 may also include an optional operator's pendant 26 for manually jogging the axes of the positioning apparatus 18. The system 10 also includes an HFHV console 28 for generating a pilot arc in the torch 12. Housed in the console 28 is a manifold for fluidic distribution including, for example, gas for shielding and sustaining the plasma arc and water for cooling a working end of the torch 12.

Figure 1B:
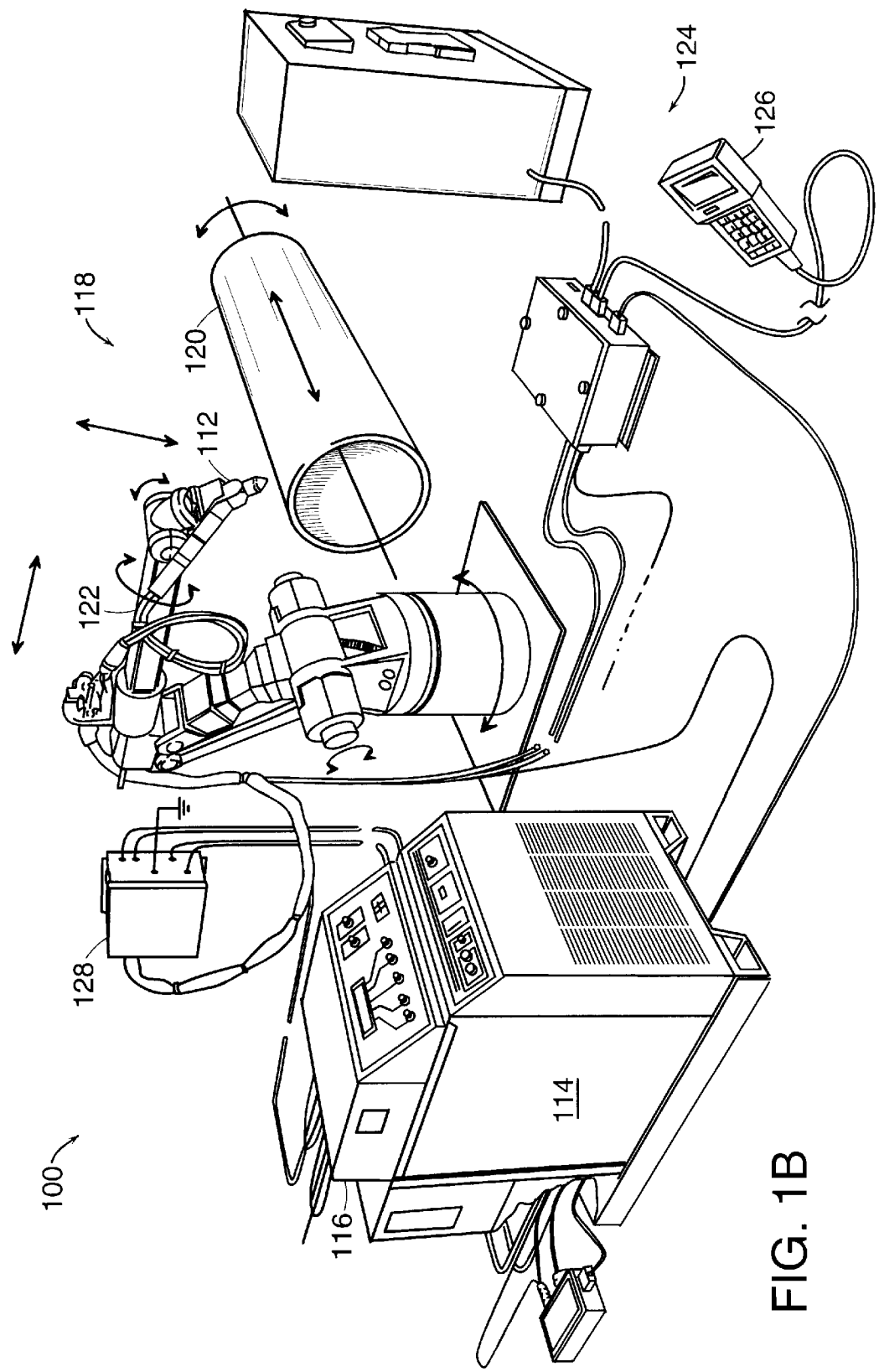
FIG. 1B is a schematic perspective view of a plasma arc torch system in accordance with an alternative embodiment of the present invention.

The control functionality of the present invention may be adapted for use in a variety of plasma arc torch systems. FIG. 1B is a schematic perspective view of a plasma arc torch system 100 in accordance with an alternative embodiment of the present invention. The system 100 includes a plasma arc torch 112 with an associated power supply 114 and a gas console 116 for generating a plasma arc. A positioning apparatus 118 includes a multi-axis, motorized robotic arm 122 on which the torch 112 is mounted. A workpiece 120 may be mounted in a fixed position, on a rotary table, on a conveyor, or otherwise suitably positioned within a work volume of the robotic arm 122. A controller 124 is provided with requisite axis drives. The controller 124 includes a first module for controlling a standoff between the torch 112 and the workpiece 120, as well as a second module for overriding the first module as will be discussed in greater detail hereinbelow. The controller 124 may also include an optional operator's pendant 126 for manually jogging the axes of the positioning apparatus 118. The system 100 also includes an HFHV console 128 for generating a pilot arc in the torch 112. Housed in the console 128 is a manifold for fluidic distribution including, for example, gas for shielding and sustaining the plasma arc and water for cooling a working end of the torch 112.

Figure 2A:
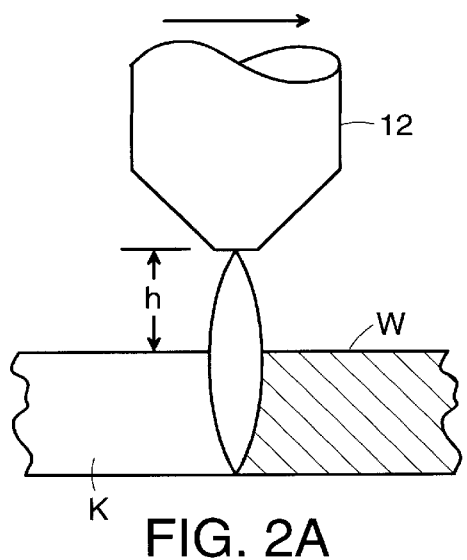
FIG. 2A is a schematic partially sectional view of a plasma arc torch working end cutting a workpiece at a constant standoff.
Figure 2B:
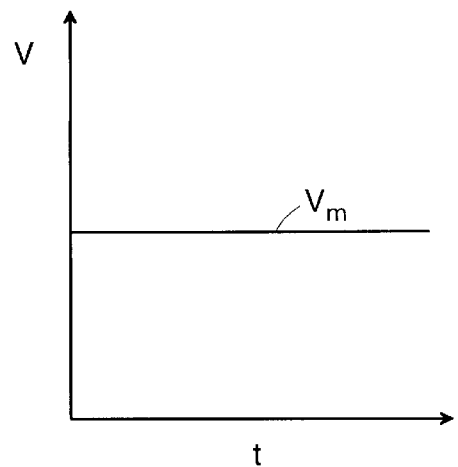
FIG. 2B is a schematic plot of measured arc voltage as a function of time for the cutting condition depicted in FIG. 2A.

During cutting of a workpiece, W, as a kerf, K, is created as depicted schematically in FIG. 2A, an optimum standoff height, h, is sought to be maintained between a tip of the torch 12 and the workpiece, W. In the case where the torch 12 is traversing the workpiece, W, at a constant standoff and at a constant traverse speed, plasma arc voltage, V, is substantially constant as depicted in the schematic plot of measured arc voltage, $V_M$, as a function of time, t, in FIG. 2B.

Figure 3:
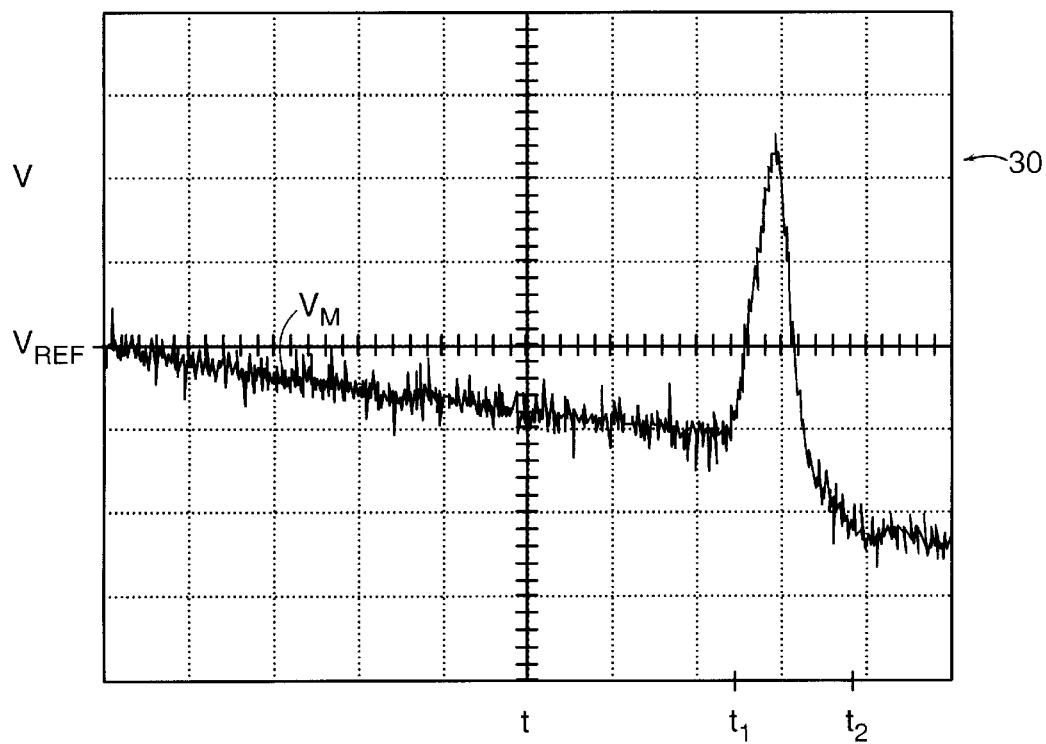
FIG. 3 is an empirical plot of measured arc voltage as a function of time for a cutting condition including workpiece warpage and a kerf crossing.

FIG. 3 is an empirical plot 30 of measured arc voltage, $V_M$, as a function of time, t, for a constant traverse speed cutting condition including workpiece warpage and a kerf crossing. There is no standoff control enabled. Unlike the constant arc voltage of the schematic plot of FIG. 2B, measured arc voltage, $V_M$, for the plot 30 has a generally negative slope. This gradual, negatively sloped curve is exemplary of localized workpiece warpage or tilt. As standoff height, h, decreases during the cut and the tip of the torch approaches the workpiece, measured arc voltage, $V_M$, decreases correspondingly. At time equal to about $t_1$, measured arc voltage, $V_M$, spikes sharply positive. This rapid increase is indicative of entering a kerf crossing condition. After reaching a maximum arc voltage value substantially corresponding to the center of the kerf, measured arc voltage rapidly decreases as the plasma arc exits the kerf crossing condition. At time equal to about $t_2$, normal cutting of the workpiece resumes.

In one embodiment, to maintain consistent cut power and quality, the controller 24 according to the invention controls standoff during the periods prior to $t_1$ and after $t_2$ by adjusting standoff to drive measured arc voltage, $V_M$, to a predetermined reference arc voltage value, $V_{REF}$. During the period between $t_1$ and $t_2$, however, control of standoff is disabled to preclude the controller 24 from reacting to the kerf crossing voltage spike and driving the torch 12 into the workpiece.

Figure 4:
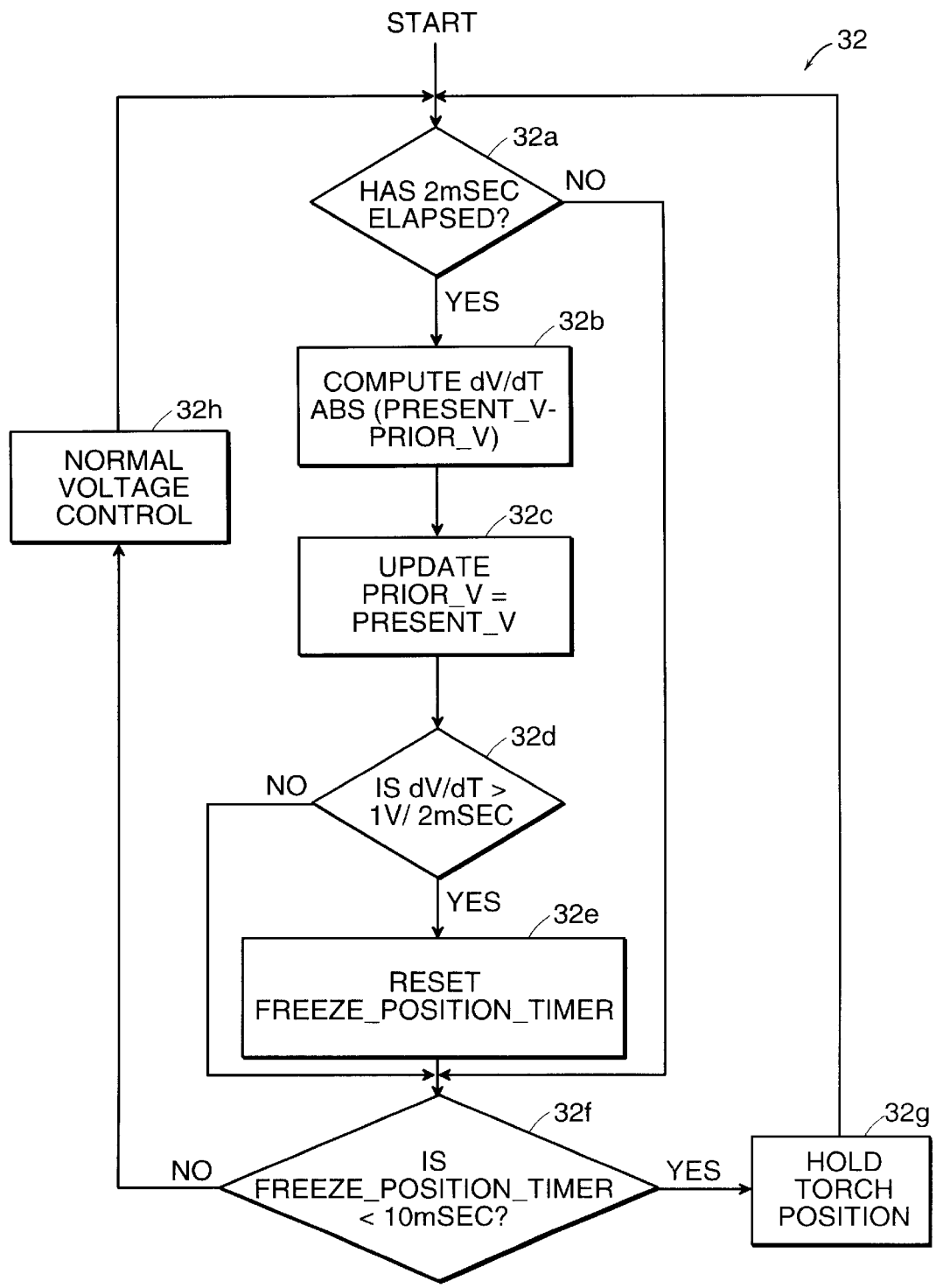
FIG. 4 is a flow chart for controlling standoff and overriding standoff control in accordance with an exemplary embodiment of the present invention.

A threshold slope value stored in the controller 24 determines when control of standoff is enabled and disabled in accordance with the algorithm depicted in the flow chart 32 of FIG. 4. The values presented in the flow chart 32 are exemplary in nature and not to be considered limiting. Any of a wide range of sampling times and threshold slope values may be employed, depending on a particular application. In the flowchart 32, a sampling rate of two milliseconds is used. Accordingly, whenever the torch 12 is operating in a transferred arc mode for processing of a workpiece, the measured arc voltage, $V_M$, is sampled every two milliseconds (step 32a) and the absolute value of the slope of the curve is calculated (steps 32b, 32c) and compared to a threshold value (step 32d). In the flow chart 32, this threshold value is set at one volt per two milliseconds or 500 volts/sec. If the absolute value of the slope of the curve is less than or equal to 500 volts/sec, control of arc voltage by adjustment of standoff remains enabled (step 32h). In the event, however, that the absolute value of the slope of the curve is greater than 500 volts/sec, as in the case of a kerf crossing spike, a freeze position timer is reset (step 32e) and the positioning system maintains the Z axis position or torch standoff height, h, for ten milliseconds (steps 32f, 32g). Thereafter, if the absolute value of the slope of the curve falls below the threshold value, control of standoff is enabled (step 32h) and the positioning apparatus 18 adjusts torch standoff height, h, to drive measured arc voltage, $V_M$, to the reference voltage, $V_{REF}$. In the event, however, that the absolute value of the slope of the curve continues to exceed the threshold value, the Z axis position is maintained (step 32g). For the robotic arm positioning apparatus 118 of the system 100, a corresponding axis position is maintained.

Testing has demonstrated that the absolute values of measured arc voltage slopes generated during a kerf crossing tend to be at least an order of magnitude greater than those generated due to workpiece warpage. For example, kerf crossing slopes can range from about 100 volts/sec to about 1000 volts/sec; whereas, warpage slopes are generally much less than 100 volts/sec. In FIG. 3, the kerf crossing spike slope is about 720 volts/sec. The warpage slope is about 14 volts/sec. Accordingly, kerf crossings and similar discontinuities can be reliably detected and accommodated readily with little chance of improperly overriding standoff control.

While FIG. 3 depicts the empirical plot 30 of a kerf crossing spike, relatively abrupt changes in measured arc voltage, $V_M$, occur during periods of traverse speed acceleration and deceleration, for example when cutting a right angle corner. By setting the threshold at an appropriate value, the tendency of the controller 24 to drive the torch 12 into the workpiece during deceleration and retract the torch 12 from the workpiece during acceleration can be overcome. The acceleration and deceleration response characteristics of the positioning apparatus 18 employed may be measured or modeled and stored in a table in the controller 24. This information, in conjunction with the type of material being cut, may be used to tailor algorithm variables such as slope threshold, sampling rate, and freeze position timer period to ensure proper system response. In an exemplary embodiment, the flow chart 32 of FIG. 4 may be implemented in a processor such as a microprocessor, with the analog arc voltage signal being first converted to a digital signal by an A/D converter.

Since an optimum torch standoff height, h, may be on the order of about 0.02 inches (0.05 cm), the controller 24 may additionally or alternatively include a contact sense control module for sensing contact between a tip of the torch 12 and a workpiece, W, and responding appropriately. FIG. 5 is a schematic block diagram of a plasma arc torch 12 including a contact sensing apparatus 34 for overriding standoff control when contact is sensed. The torch 12 includes a power supply 14 having a first lead 36 connected to an electrode 38 and a second lead 40 connected to the workpiece. The second lead 40 is also connected to a nozzle 42 through a switch 44 to enable generation of a pilot arc between the electrode 38 and the nozzle 42. The contact sensing apparatus 34 is connected to the workpiece, W, for example via the second lead 40, and to a tip of the torch 12 electrically isolated from the electrode 38 such as the nozzle 42 or a shield 46, as depicted. The circuitry of the contact sensing apparatus 34 may be housed in the controller 24 and is discussed in greater detail hereinbelow with respect to FIG. 8.

The contact sensing apparatus 34 operates in accordance with an algorithm depicted in the flow chart 48 of FIG. 6 and senses contact between the shield 46 and the workpiece, W, by means of a contact signal. Whenever the system 10 is operational, the shield 46 is held at a voltage potential relative to the workpiece, W. Upon contact between the shield 46 and the workpiece, W, resistance therebetween drops substantially to zero and current flows through the contact sensing apparatus 34. As soon as contact is sensed (step 48a), the controller 24 overrides standoff control and retracts the torch 12 from the workpiece, W, at a maximum rate (step 48b). When an absence of contact is sensed, standoff control is enabled (step 48c).

Figure 7:
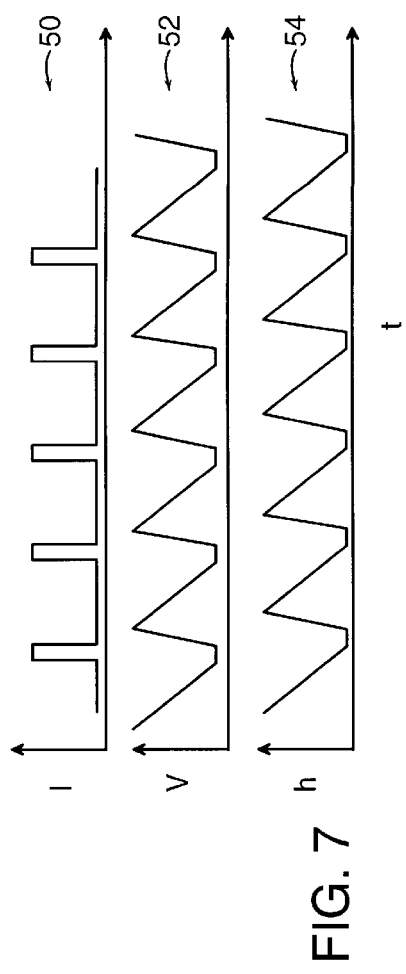
FIG. 7 is a schematic graphical representation of system parameters correlated as a function of time in accordance with the flow chart depicted in FIG. 6.

FIG. 7 is a schematic representation of selected system parameters correlated as a function of time in accordance with the algorithm depicted in the flow chart 48 of FIG. 6 for a system 10 in which the reference voltage, $V_{REF}$, is set too low or a consumable portion of the torch 12 such as the electrode 38 is worn excessively. The uppermost trace 50 represents contact sensing apparatus current, I, the center trace 52 represents plasma arc voltage, V, and the lower trace 54 represents torch standoff height, h. Under the aforementioned maladjusted operating conditions, the torch 12 is driven into the workpiece, W, in an attempt to minimize the deviation between the measured arc voltage, $V_M$, and the reference voltage, $V_{REF}$. When contact occurs between the shield 46 and the workpiece, W, current flows in the contact sensing apparatus 34 as indicated by the step function rise of the current trace 50. The controller 24 then overrides standoff control and causes the Z axis to decelerate to a stop and reverse direction, retracting the torch 12 at a maximum rate as depicted in the standoff height trace 54. As soon as an absence of contact is sensed, current stops flowing in the contact sensing apparatus 34 as indicated by the step function drop of the current trace 50. Thereafter, standoff control is enabled. In the case depicted, the contact and retract cycle continues to repeat due to the improper setting of the reference voltage, $V_{REF}$, or the worn electrode 38; however, in normal operation, contact and override of standoff control would occur infrequently.

Figure 8:
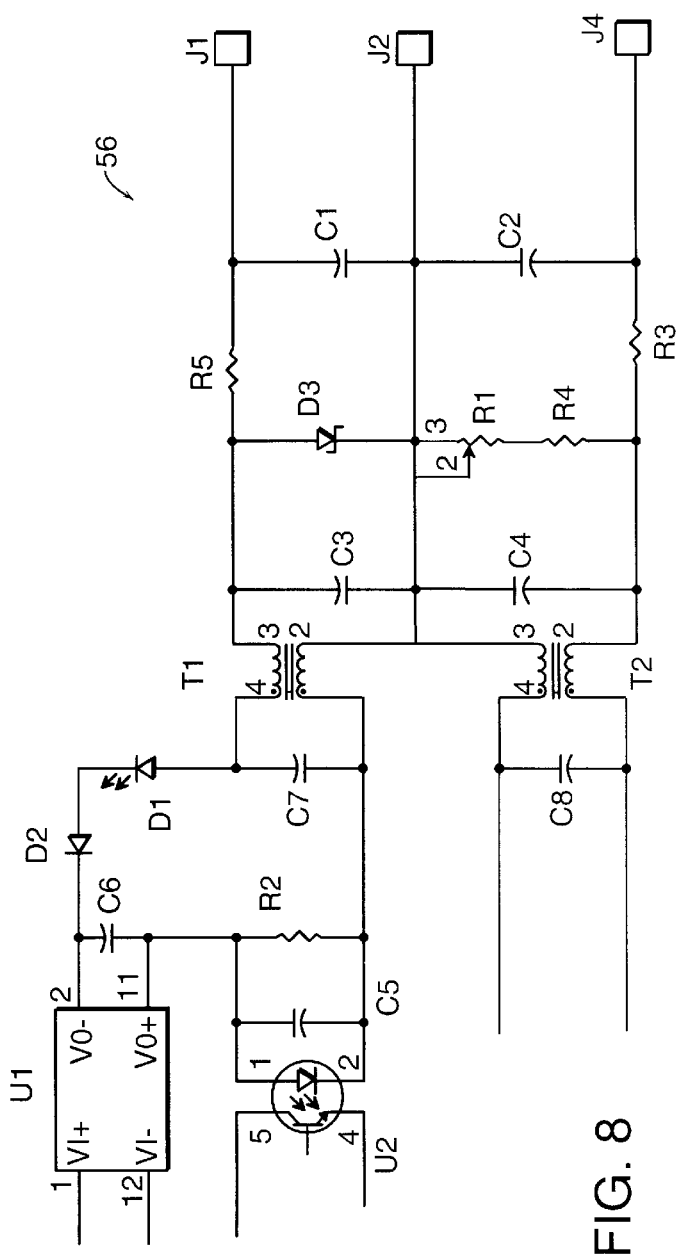
FIG. 8 is a schematic of a circuit for implementing contact sense override of standoff control in accordance with the alternative embodiment of the present invention.

An exemplary circuit 56 for implementing contact sense override of standoff control is shown schematically in FIG. 8. Also depicted therein is a portion of a circuit for measuring arc voltage, $V_M$. A first connector, J1, may be connected to the shield 46 or other electrically conductive structure located at the tip of the torch 12 and a second connector, J2, is connected to the workpiece, W. A power supply, such as a floating, isolated DC to DC converter, U1, provides a voltage potential across the connectors J1, J2, of 24 VDC, for example. When the connectors J1, J2 come into electrical contact due to contact between the shield 46 and the workpiece, W, current flows through the circuit 56. A contact indicator, such as an LED, D1, may be used to provide a visual indication of contact between the torch 12 and the workpiece, W. The contact signal is transmitted through an optical coupler, U2, to signal the controller 24 to override the standoff control and retract the torch 12.

Since the circuitry is energized during processing of the workpiece by the torch 12, the possibility exists that the high energy plasma arc could short to the shield 46. To prevent damage to the circuit 56 from a high current, high voltage short, power in the circuit is limited by the combination of a current limiting resistor, R5, and a zener diode, D3, which clamps voltage to a predetermined maximum value such as about 40 VDC. Frequency protection for the circuit 56 is afforded by the combination of several capacitors and a transformer, T1, which form a common mode choke to eliminate passage of high frequencies. The circuit 56 also includes an adjustable resistor, R1, which can be used to calibrate the circuit 56.

A third connector, J4, may be connected to the electrode 38 and the signal between the electrode 38 and the workpiece, W, passed through a second transformer, T2, to filter and scale an analog arc voltage signal, $V_M$. As stated hereinabove, the analog signal thereafter passes through an isolation amplifier and an A/D converter to generate a digital arc voltage signal for processing by the controller 24.

Figure 10:
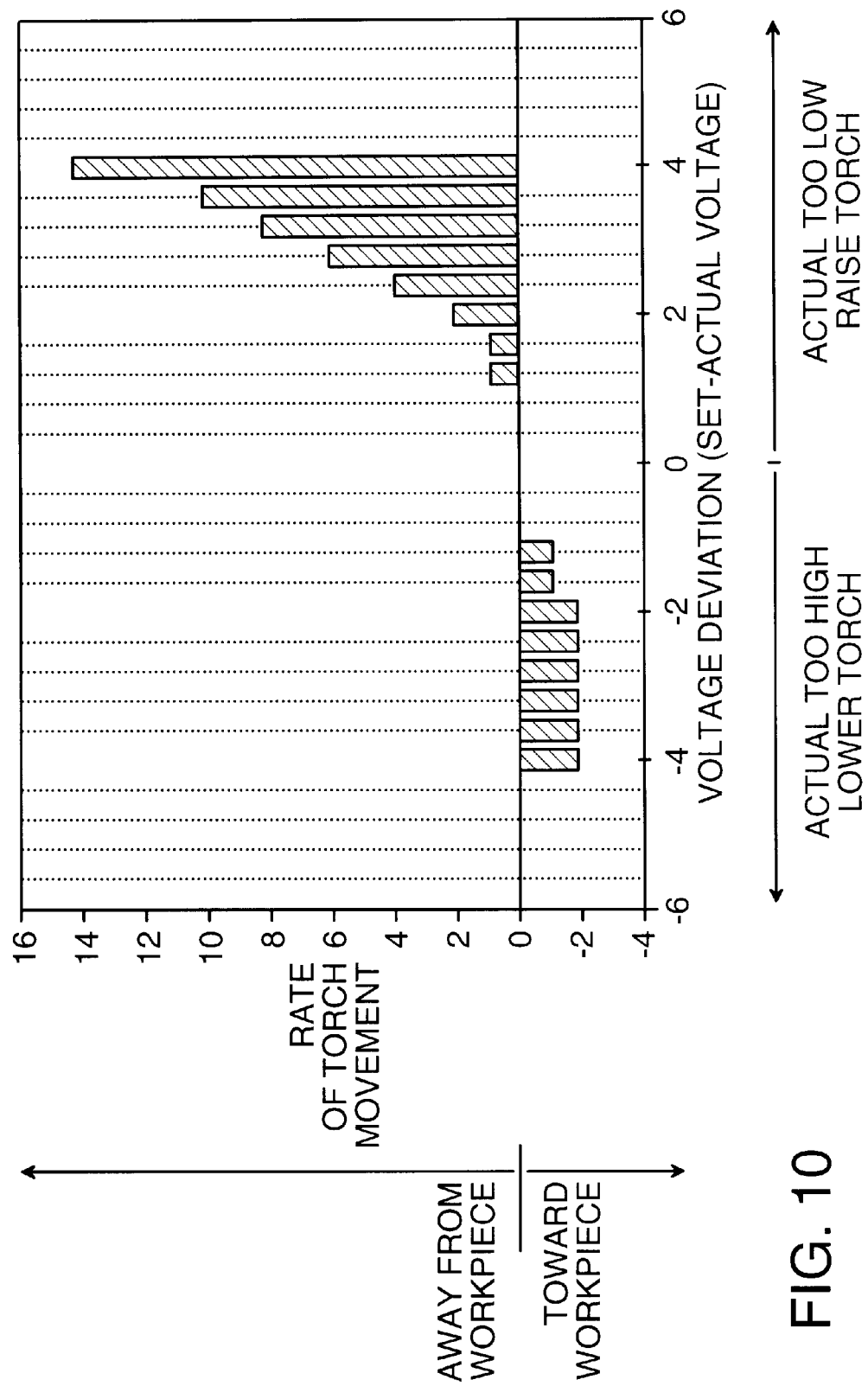
FIG. 10 is a schematic plot of a torch movement rate profile with the rate clamped when the voltage deviation exceeds a predetermined value.
Figure 11:
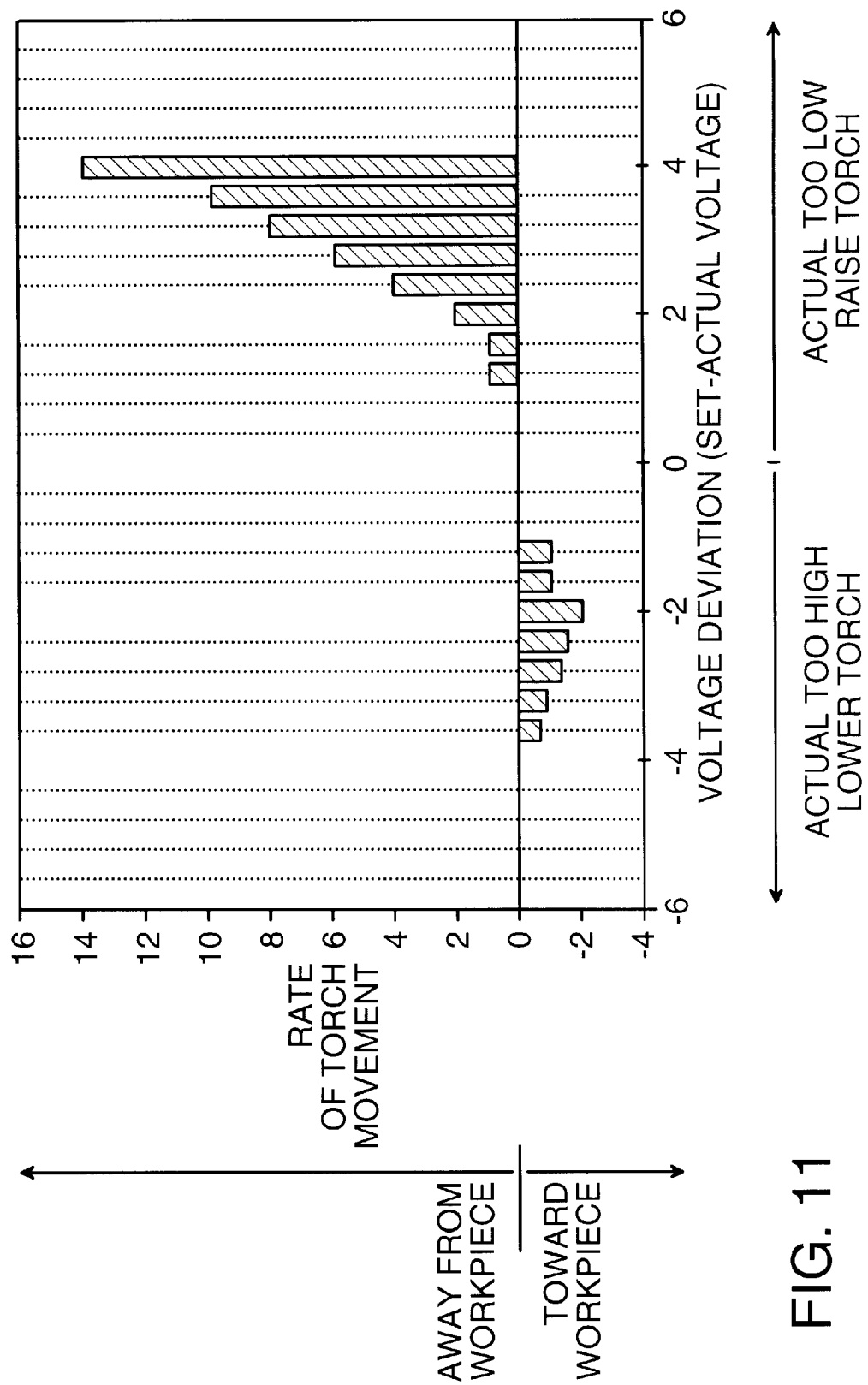
FIG. 11 is a schematic plot of a torch movement rate profile with the rate clamped when the voltage deviation exceeds a predetermined value.

In another embodiment, a torch height control system maintains a substantially constant operating parameter of the arc voltage during processing of the workpiece without requiring a freeze signal from the controller to override the first module which controls a standoff between the torch and the workpiece. The operation of the torch height control system of this embodiment is depicted in the flow chart 90 of FIG. 9. During the processing of the workpiece, the arc voltage is measured at a predetermined interval (step 90a). The measured arc voltage is compared to a reference voltage value to generate a voltage deviation (step 90b). The voltage deviation is compared to a predetermined deviation value (step 90c). If the voltage deviation exceeds the predetermined deviation value, the rate of torch movement relative to the workpiece is clamped (step 90d). In one embodiment, the rate of torch movement is clamped by maintaining the rate of torch movement at a constant predetermined value (See FIG. 10). The constant rate may be maintained for a predetermined period of time. In another embodiment, the rate of torch movement is clamped by decreasing the rate of torch movement for a predetermined period of time (See FIG. 11). If the voltage deviation does not exceed the predetermined deviation value, the standoff between the torch and the workpiece is adjusted by moving the torch relative to the workpiece according to a torch movement rate profile (step 90e). According to the rate profile, the rate increases with an increase in the deviation unless the rate is clamped. The rate, for example, may non-linearly increase with an increase in the deviation. In one embodiment, only the rate of torch movement toward the workpiece which exceeds the predetermined voltage deviation is clamped, while the rate of torch movement away from the workpiece continues to increase with an increase in the deviation.

Advantages of this embodiment are several. First, this torch height control system prevents the torch from crashing into the workpiece when the voltage deviation increases due to its encounter with a kerf or a corner of the workpiece. Second, cut quality is improved by either maintaining a constant rate of torch movement relative to the workpiece or decreasing the rate of torch movement. Third, this torch height control system is able to work with a controller that is unable to provide a freeze signal, thereby allowing the system to be used with a wider variety of controllers.

Figure 12B:
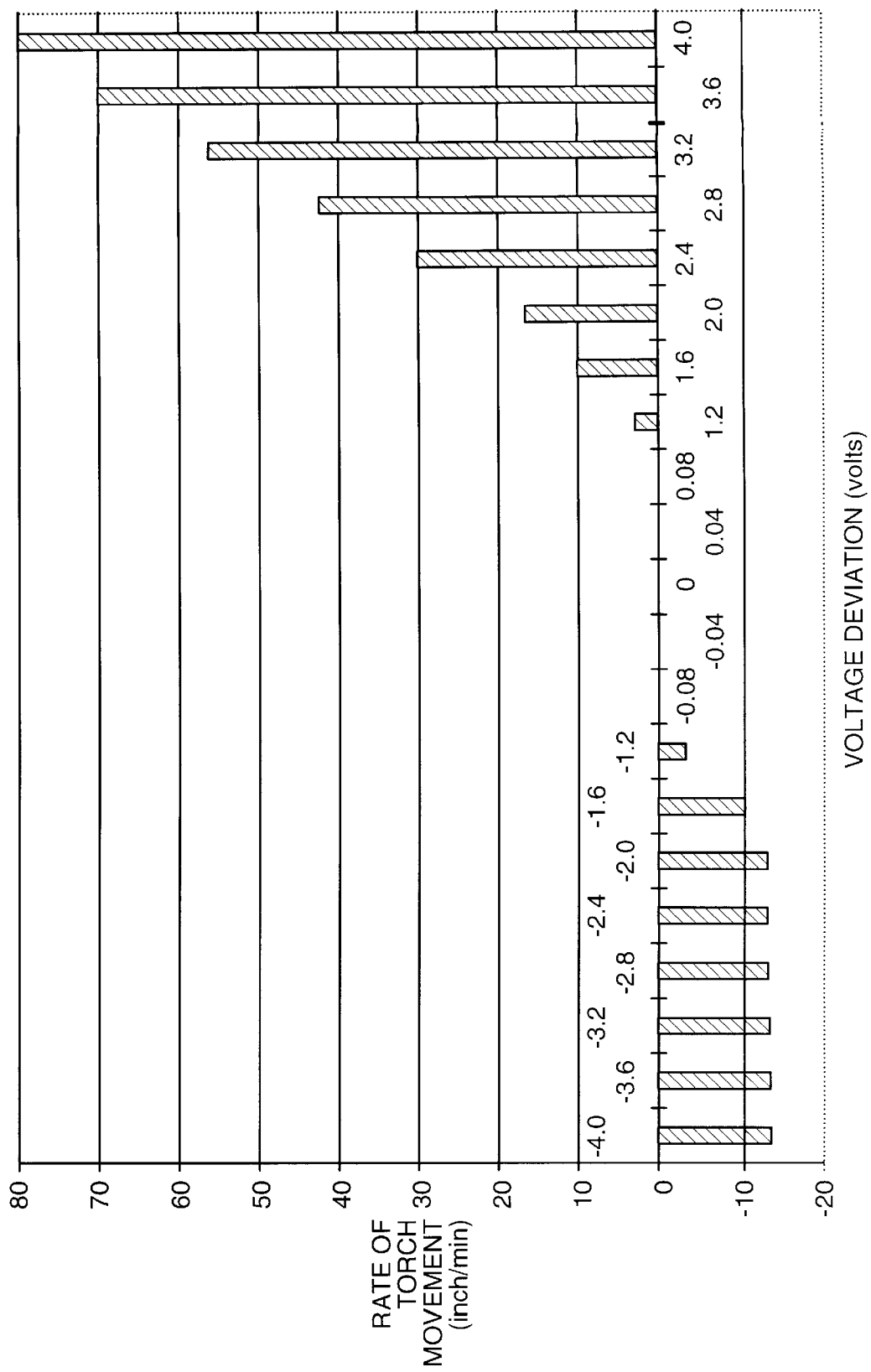
FIG. 12B illustrates a normal torch movement rate profile with a limited down speed for a robotic lifter.
Figure 12C:
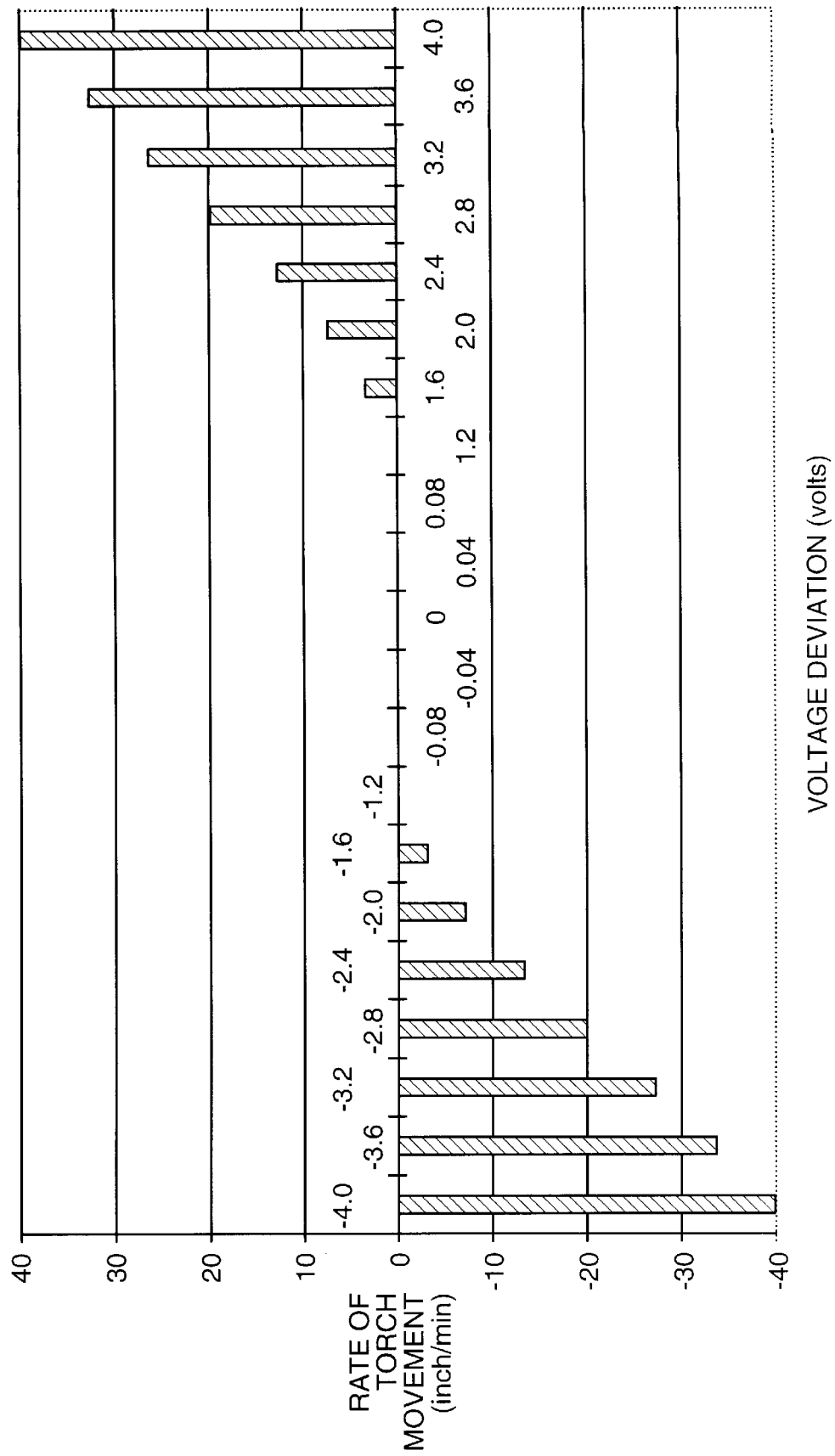
FIG. 12C illustrates a slow symmetric torch movement rate profile for a robotic lifter.
Figure 13B:
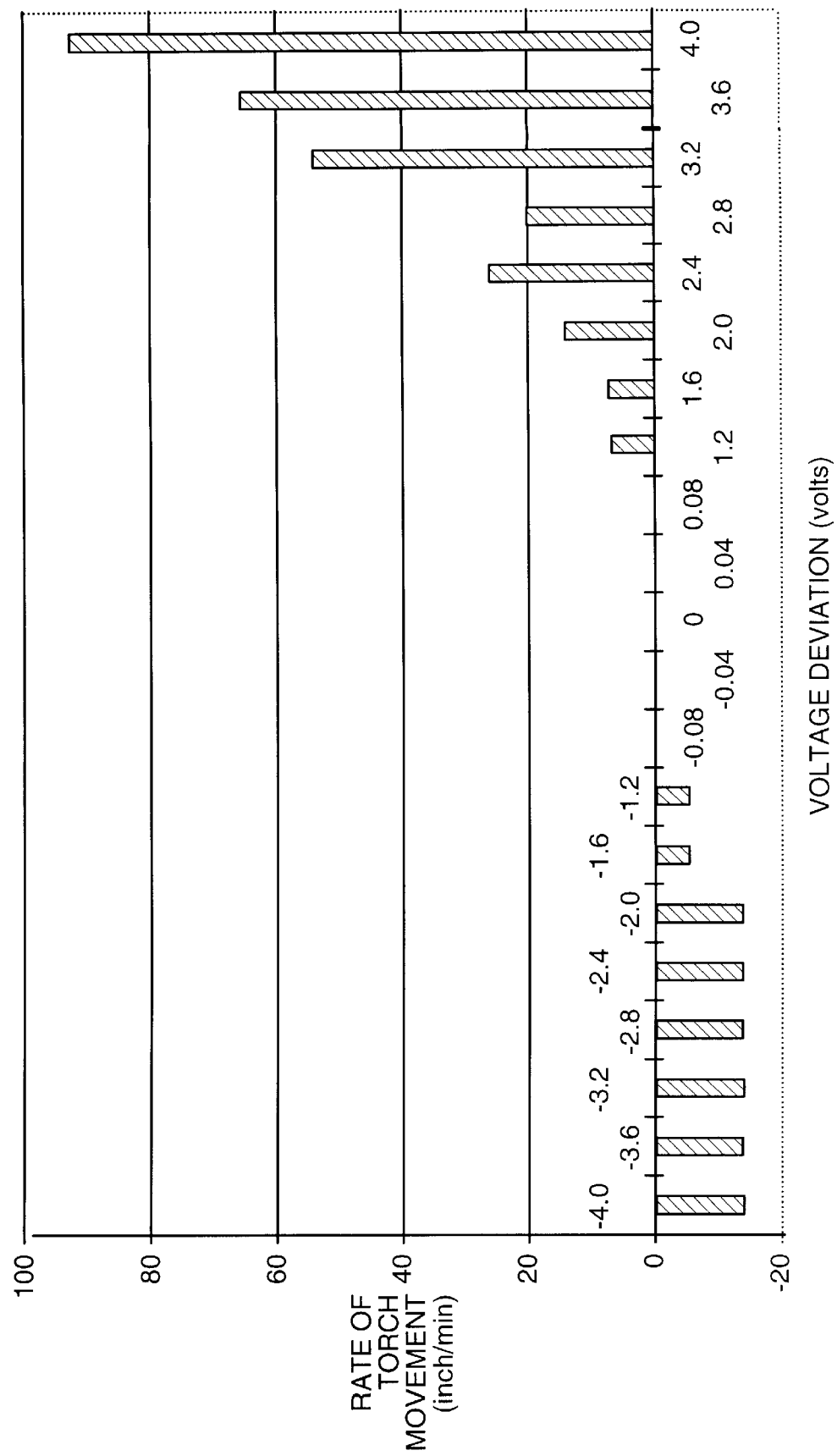
FIG. 13B illustrates a normal torch movement rate profile with a limited down speed for an XY lifter.
Figure 13C:
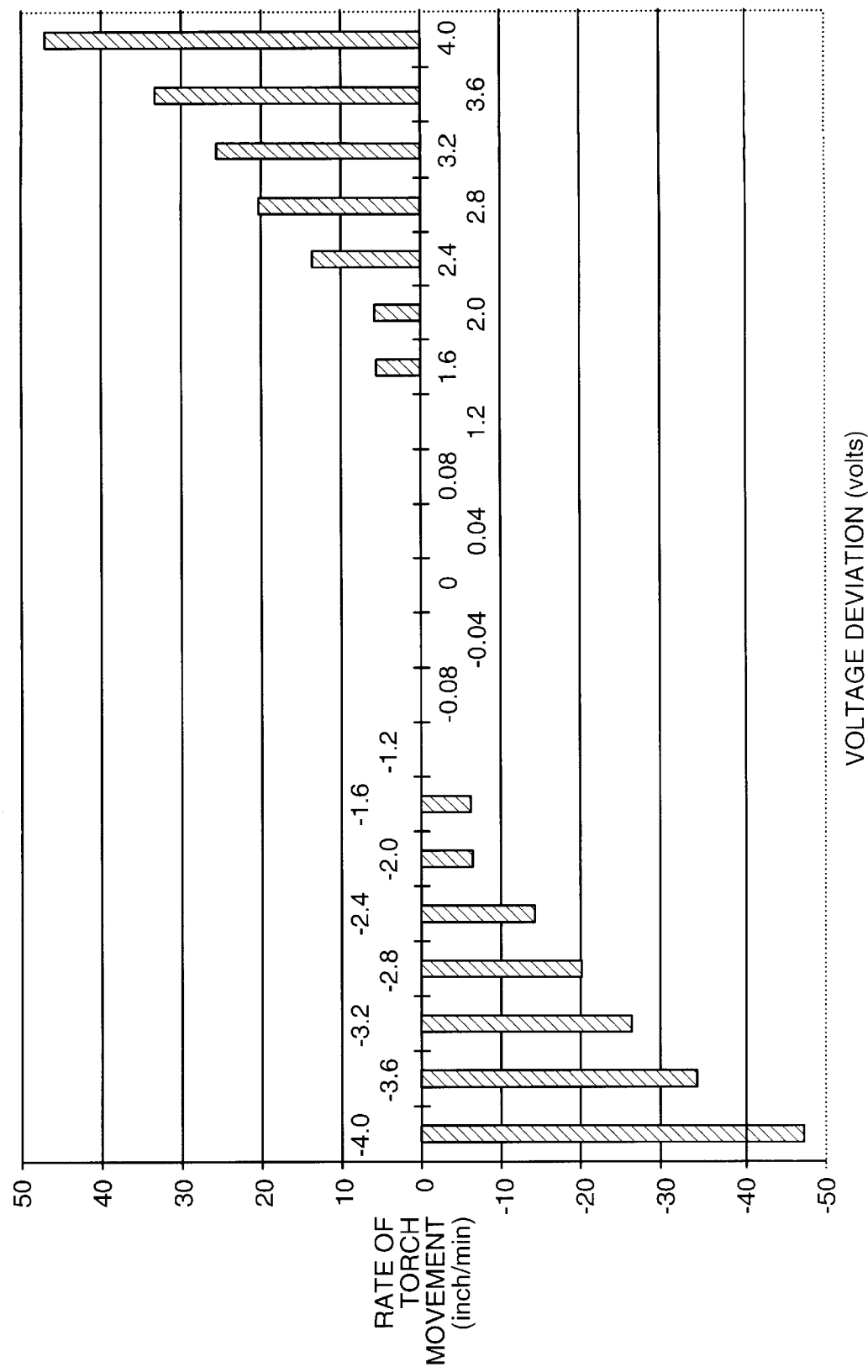
FIG. 13C illustrates a slow symmetric torch movement rate profile for an XY lifter.
Figure 13D:
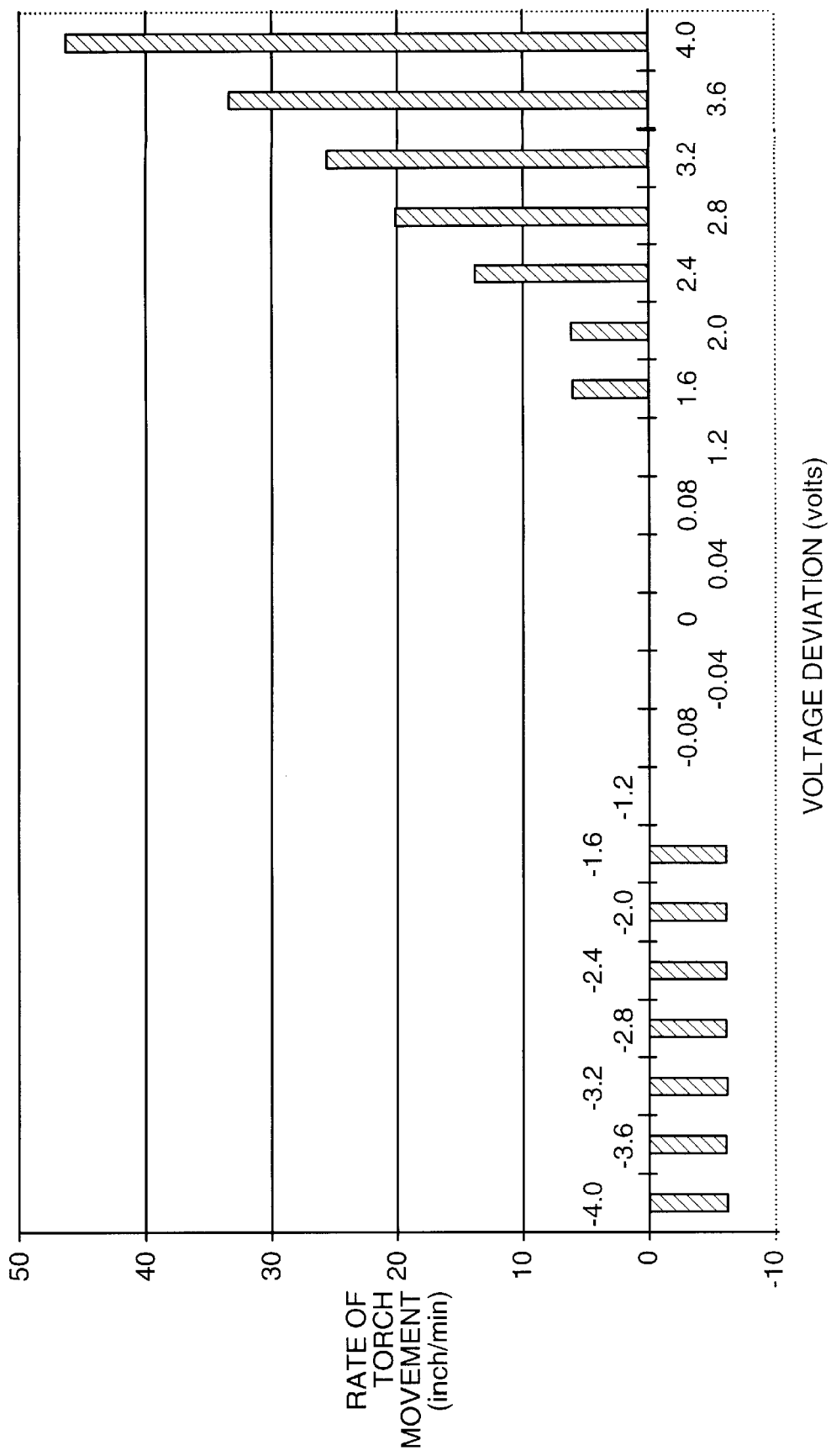
FIG. 13D illustrates a slow torch movement rate profile with a limited down speed for an XY lifter.
Figure 14:
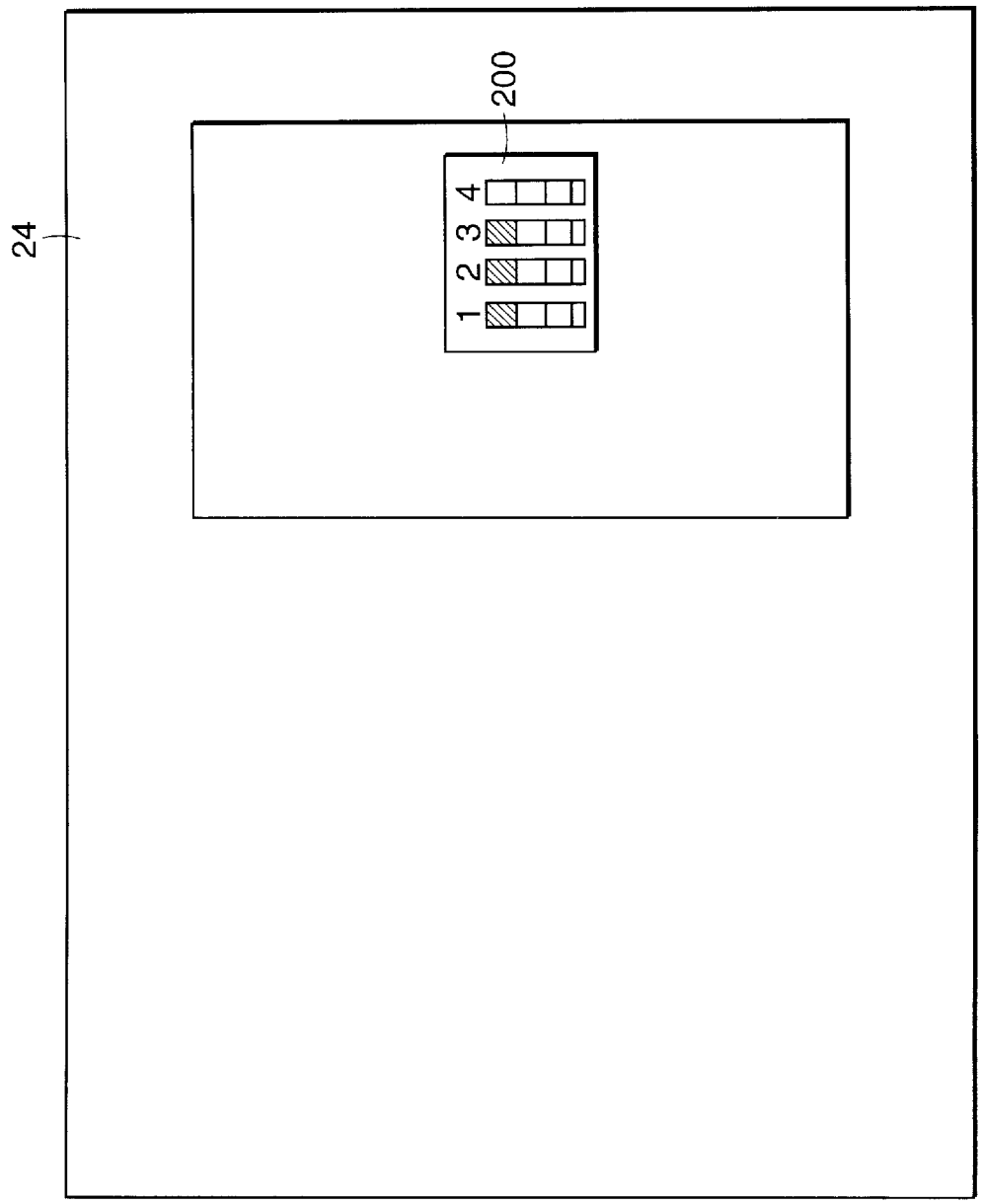
FIG. 14 illustrates a selection mechanism for a positioning apparatus of a plasma arc torch system in accordance with an embodiment of the present invention.

In one embodiment, the torch height control system can provide a user an opportunity to select a desired rate profile for the movement of the torch relative to the workpiece by including a selection mechanism in the positioning apparatus of a plasma arc torch system. The selection mechanism, for example, may include a plurality of jumpers or switches (200). Alternatively, the selection mechanism may be menu selectable. Selection parameters for the selection mechanism include, for example, error resolution and response speed. Referring to FIGS. 12A–12D, a user of a robotic lifter coupled to the torch height control system may select a standard high speed symmetric rate profile shown in FIG. 12A, in which there is no clamping, or a high speed asymmetric rate profile shown in FIG. 12B, in which the rate of torch movement toward the workpiece is clamped when the voltage deviation exceeds a predetermined value. In FIG. 12B, the predetermined value is 1.8 volts. Alternatively, the user may select a low speed asymmetric profile or a low speed symmetric rate profile shown in FIGS. 12C and 12D. FIGS. 12A–12D represent rate profiles with an error resolution of ±0.4 volts. Alternatively, the user may select an error resolution of ±0.8 volts. FIGS. 13A–13D show exemplary rate profiles which can be used with an XY lifter.

Figure 9:
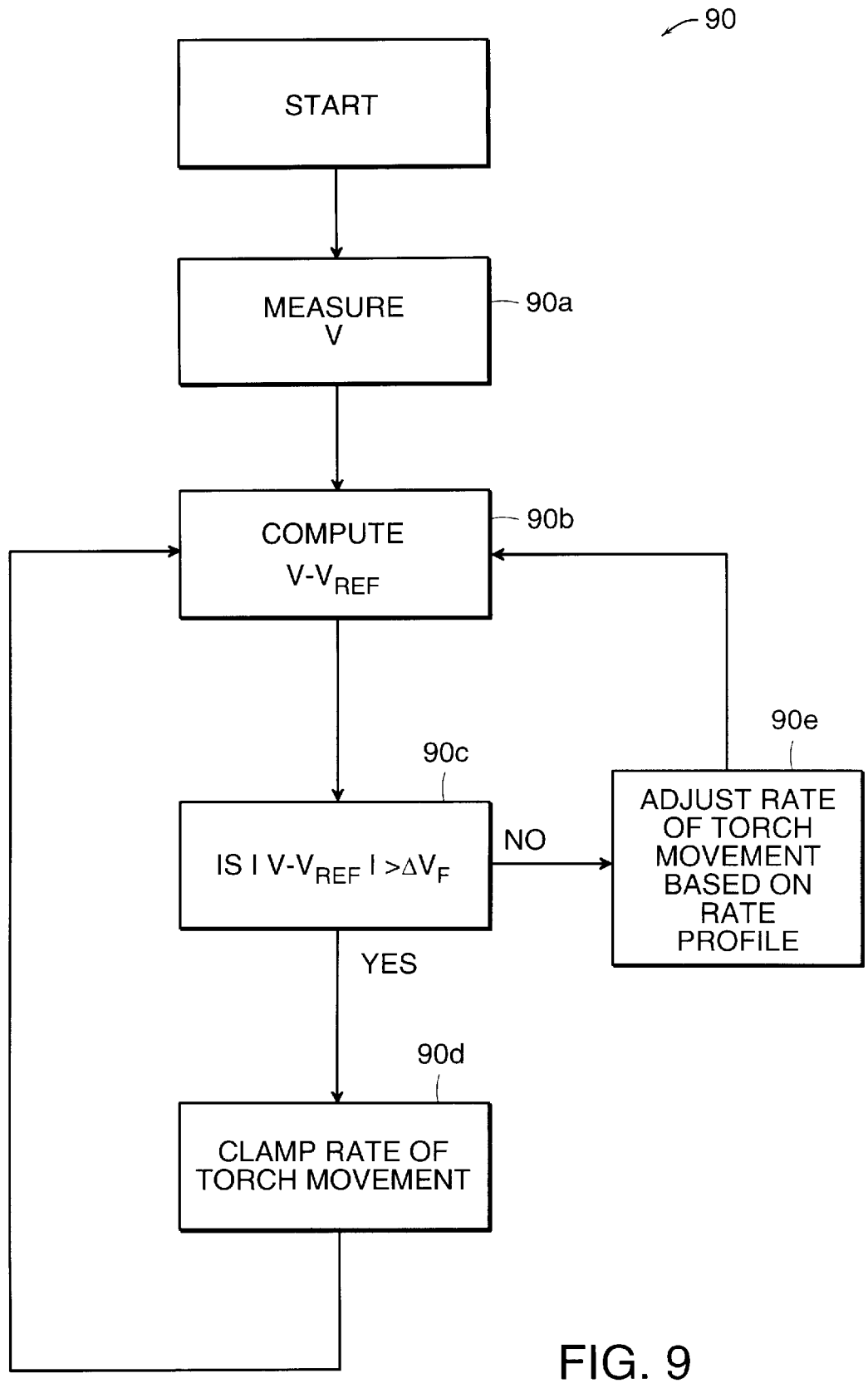
FIG. 9 is a flow chart for controlling standoff in a torch height control system.

In one embodiment, the torch height control system of FIG. 9 is used in conjunction with a contact sensing apparatus which monitors contact between the torch tip and the workpiece. When the torch tip contacts the workpiece, the torch height control system is overridden and the torch moves away from the workpiece.

While there have been described herein what are to be considered exemplary and preferred embodiments of the present invention, other modifications of the invention will become apparent to those skilled in the art from the teachings herein. For example, the controller may be programmed to respond differently upon detection of a kerf crossing or contact between the torch and the workpiece. Additionally, the control algorithms could be used to detect the spatial location of an edge of the workpiece instead of or in addition to a kerf or other discontinuity. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A method of processing a workpiece using a plasma arc torch comprising the steps of:
   (a) positioning the torch proximate the workpiece;
   (b) generating an arc between the torch and the workpiece;
   (c) moving the torch relatively to the workpiece along a processing path; and
   (d) maintaining a substantially constant operating parameter of the arc during processing of the workpiece by:
      (i) measuring the operating parameter;
      (ii) comparing the operating parameter to a reference value to generate a deviation;
      (iii) adjusting a standoff between the torch and the workpiece by moving the torch relative to the workpiece at a rate which increases with an increase in the deviation to minimize the deviation; and
      (iv) clamping the rate of torch movement relative to the workpiece when the deviation exceeds a predetermined value.

2. The method of claim 1 wherein the step of clamping the rate of torch movement comprises clamping the rate of torch movement toward the workpiece when the deviation exceeds a predetermined value.

3. The method of claim 1 wherein the step of clamping the rate of torch movement comprises maintaining the rate at a constant predetermined value.

4. The method of claim 1 wherein the step of clamping the rate of torch movement comprises decreasing the rate of torch movement.

5. The method of claim 1 wherein the operating parameter comprises an arc voltage.

6. The method of claim 1 wherein the rate of torch movement non-linearly increases with an increase in the deviation.

7. The method of claim 1 further comprising the step of selecting a desired rate profile for the movement of the torch relative to the workpiece.

8. The method of claim 7 wherein the step of selecting a desired rate profile comprises selecting an error resolution and a response speed.

9. The method of claim 1 wherein the pre-determined deviation value ranges from about 2 volts to about 4 volts.

10. A plasma arc torch system comprising:
    a plasma arc torch for generating an arc between the torch and a workpiece;
    a positioning apparatus for moving the torch relative to the workpiece; and
    a torch height control system for maintaining a substantially constant operating parameter of the arc during processing of the workpiece, the torch height control system comprising:
       a first module for measuring the operating parameter, comparing the operating parameter to a reference value to generate a deviation, and adjusting a standoff between the torch and the workpiece by moving the torch relative to the workpiece at a rate which increases with an increase in the deviation to minimize the deviation; and
       a second module for clamping the rate of torch movement relative to the workpiece when the deviation exceeds a predetermined value.

11. The system of claim 10 wherein the second module for clamping the rate of torch movement clamps the rate by maintaining the rate at a constant predetermined value or decreasing the rate.

12. The system of claim 10 wherein the operating parameter comprises an arc voltage.

13. The system of claim 10 wherein the positioning apparatus comprises a selection mechanism for selecting a desired rate profile for a movement of the torch relative to the workpiece.

14. The system of claim 13 wherein selection parameters for the selection mechanism include an error resolution and a response speed.

15. The system of claim 13 wherein the selection mechanism includes a plurality of switches for selecting the desired rate profile.

* * * * *